United States Patent
Suryanarayana (10) Patent No.: US 10,461,651 B2
(45) Date of Patent: Oct. 29, 2019

(54) SOFT-SWITCHING POWER CONVERTERS USING AIR-CORE RESONANT INDUCTOR

(71) Applicant: ABB Schweiz AG, Baden (CH)

(72) Inventor: Harish Suryanarayana, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/832,283

(22) Filed: Dec. 5, 2017

(65) Prior Publication Data

US 2019/0173388 A1 Jun. 6, 2019

(51) Int. Cl.
*H02M 3/335* (2006.01)
*H02M 7/523* (2006.01)
*H02M 7/537* (2006.01)
*H02M 7/48* (2007.01)
*H02M 1/00* (2006.01)

(52) U.S. Cl.
CPC ... *H02M 3/33592* (2013.01); *H02M 3/33546* (2013.01); *H02M 7/48* (2013.01); *H02M 2001/0048* (2013.01)

(58) Field of Classification Search
CPC ............. H02M 3/335; H02M 3/33507; H02M 3/33546; H02M 3/33569; H02M 3/33592; H02M 7/48; H02M 7/523; H02M 7/537
See application file for complete search history.

(56) References Cited

U.S. PATENT DOCUMENTS

| 3,957,329 A * | 5/1976 | McConnell | H02H 9/028 361/104 |
| 6,172,882 B1 * | 1/2001 | Tanaka | H02M 7/5387 363/132 |
| 6,175,727 B1 * | 1/2001 | Mostov | H01F 17/0006 174/255 |

(Continued)

OTHER PUBLICATIONS

Li, Yong et al., "A Three-Phase Soft-Transition Inverter with a Novel Control Strategy for Zero-Current and Near Zero-Voltage Switching," IEEE Transactions on Power Electronics, Sep. 2001, pp. 710-723, vol. 16, No. 5, IEEE, Piscataway, NJ.

(Continued)

*Primary Examiner* — Adolf D Berhane
*Assistant Examiner* — Sisay G Tiku
(74) *Attorney, Agent, or Firm* — J. Bruce Schelkopf; Taft Stettinius & Hollister LLP (57) ABSTRACT

Unique systems, methods, techniques and apparatuses of a power converter are disclosed. One exemplary embodiment is a resonant power converter comprising a DC bus, a primary leg, an auxiliary leg, and an LC resonant circuit. The auxiliary leg is coupled between DC bus and includes a first auxiliary switch and a second auxiliary switch coupled at an auxiliary midpoint connection. The LC resonant circuit includes an air-core resonant inductor and a resonant capacitor coupled between the auxiliary midpoint connection and a primary midpoint connection of the primary leg. A controller is structured to control the first and second auxiliary switch and the first and second primary switch so as to (Continued)

provide resonant operation of the LC resonant circuit effective to provide a substantially zero voltage condition across the first and second primary switch while toggling the switches.

18 Claims, 5 Drawing Sheets

(56) References Cited

U.S. PATENT DOCUMENTS

| | | | | |
|---|---|---|---|---|
| 6,211,625 | B1* | 4/2001 | Nilssen | H02M 7/53832 |
| | | | | 315/205 |
| 6,246,599 | B1* | 6/2001 | Jang | H02M 3/337 |
| | | | | 363/132 |
| 6,337,801 | B2 | 1/2002 | Li et al. | |
| 6,349,044 | B1* | 2/2002 | Canales-Abarca | H02M 1/34 |
| | | | | 363/134 |
| 7,864,013 | B2* | 1/2011 | Muelleman | F41B 6/006 |
| | | | | 336/178 |
| 9,276,413 | B1* | 3/2016 | Zhang | H02J 50/12 |
| 9,502,987 | B1* | 11/2016 | Feno | H02M 3/33546 |
| 2001/0033507 | A1* | 10/2001 | Li | H02M 7/48 |
| | | | | 363/132 |
| 2004/0257272 | A1* | 12/2004 | Jacobson | H01Q 3/26 |
| | | | | 342/175 |
| 2005/0218833 | A1* | 10/2005 | Kastle | H05B 41/2827 |
| | | | | 315/244 |
| 2006/0158911 | A1* | 7/2006 | Lincoln | H02H 7/122 |
| | | | | 363/56.01 |
| 2009/0034299 | A1* | 2/2009 | Lev | H02M 3/33592 |
| | | | | 363/17 |
| 2009/0046482 | A1* | 2/2009 | Smith | H02M 3/33569 |
| | | | | 363/17 |
| 2010/0244580 | A1* | 9/2010 | Uchida | H02J 5/005 |
| | | | | 307/104 |
| 2012/0256614 | A1* | 10/2012 | Sinclair | H01F 38/023 |
| | | | | 323/355 |
| 2013/0169035 | A1* | 7/2013 | Nakashima | H02M 1/32 |
| | | | | 307/9.1 |
| 2013/0343091 | A1* | 12/2013 | Njiende T. | H01F 30/06 |
| | | | | 363/16 |
| 2014/0336485 | A1* | 11/2014 | Mujeeb-U-Rahman | |
| | | | | A61B 5/1473 |
| | | | | 600/345 |
| 2016/0365795 | A1* | 12/2016 | Madsen | H02M 3/158 |
| 2017/0025965 | A1 | 1/2017 | Ramabhadran et al. | |
| 2017/0237339 | A1* | 8/2017 | Young | H02M 1/4225 |
| | | | | 363/126 |
| 2017/0324321 | A1* | 11/2017 | Hoyerby | H02M 3/07 |
| 2017/0331382 | A1* | 11/2017 | Uehara | H02M 1/08 |
| 2017/0338730 | A1* | 11/2017 | Suryanarayana | H01F 3/14 |
| 2018/0034383 | A1* | 2/2018 | Aldhaher | H02M 7/537 |
| 2018/0152108 | A1* | 5/2018 | Kim | H02M 3/335 |

OTHER PUBLICATIONS

Li, Yong, "Unified Zero-Current-Transition Techniques for High-Power Three-Phase PWM Inverters," Dissertation to the faculty of the Virginia Polytechnic Institute and State University, Mar. 29, 2002, pp. 22-53, Piscataway, NJ, available at https://vtechworks.lib.vt.edu/handle/10919/26843 as of Nov. 8, 2017.

Li, Yong et al., "A Simplified Three-Phase Zero-Current-Transition Inverter With Three Auxiliary Switches," IEEE Transactions on Power Electronics, May 2003, pp. 802-813, vol. 18, No. 3, IEEE, Piscataway, NJ.

\* cited by examiner

SOFT-SWITCHING POWER CONVERTERS USING AIR-CORE RESONANT INDUCTOR

BACKGROUND

The present disclosure relates generally to power converters. Energy losses caused by operating the switches of a power converter can be reduced by toggling switches during periods of time where current through the switch or voltage across the switch is substantially zero. The process by which a power converter operates an auxiliary circuit to generate a zero current condition or a zero voltage condition while toggling a switch is called soft-switching. Existing soft-switching power converters suffer from a number of shortcomings and disadvantages. There remain unmet needs including reducing the power losses in the auxiliary circuit, and reducing the size of the passive components therein. For instance, some auxiliary circuits of soft-switching power converters include magnetic core inductors which lead to increased losses due to the peaky nature of the current that flows through them. Increased losses require larger heatsinks to dissipate the heat which leads to bulkier converters. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for resonant power converters. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
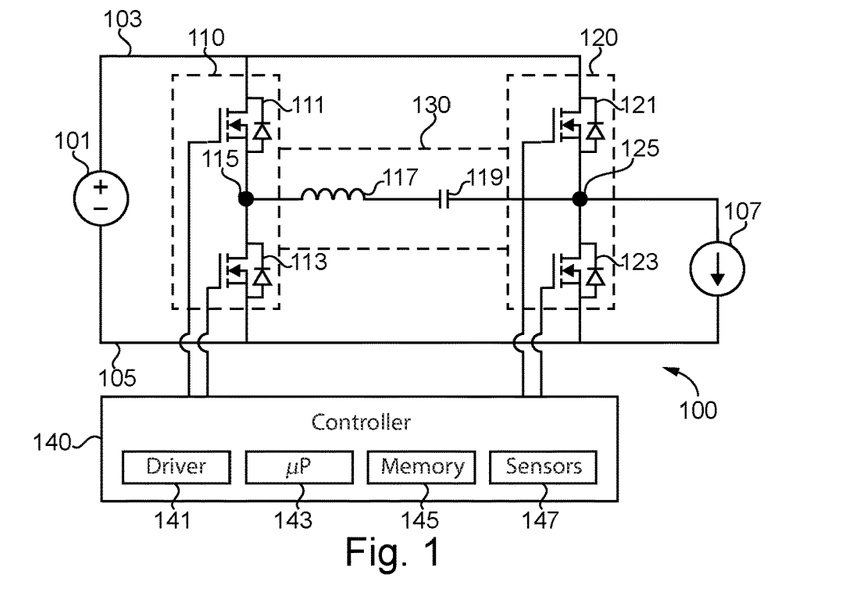
FIG. 1 illustrates an exemplary power converter.

With reference to FIG. 1 there is illustrated an exemplary resonant power converter 100. It shall be appreciated that converter 100 may be implemented in a variety of applications, including uninterruptible power supplies, machine drives, converters coupled to power generation sources, or any other application using a two-level power converter, to name but a few examples.

Converter 100 is coupled to a direct current (DC) power source 101 and a load 107. Converter 100 is a DC/AC converter structured to receive DC power from DC power source 101, convert the DC power to alternating current AC power, and output the converted AC power to load 107. In certain embodiments, DC power source 101 is a DC power network, a DC power storage system, a DC power generation system, or an alternating current (AC) power source coupled to an AC/DC power converter. Load 107 may be a utility grid or an electric machine, to name but a few examples. It shall be appreciated that converter 100 may be operated as an AC/DC converter structured to receive AC power and output DC power, or a DC/DC converter structured to receive DC power with a first voltage and output DC power with a second voltage. In certain embodiments, converter 100 is part of a multiphase power converter in which converter 100 is structured to output one phase of the multiphase AC output to load 107.

Converter 100 includes a positive DC rail 103 and a negative DC rail 105, both structured to be coupled to DC power source 101 and receive DC power from DC power source 101. Converter 100 also includes a primary leg 120 coupled between rail 103 and rail 105, an auxiliary leg 110 coupled between rail 103 and rail 105, and an LC resonant circuit 130 coupled between auxiliary leg 110 and primary leg 120.

Primary leg 120 includes primary switching devices 121, 123. Switching device 121 includes a first terminal coupled to DC rail 103 and a second terminal coupled to a primary midpoint connection 125. Switching device 123 includes a first terminal coupled to primary midpoint connection 125 and a second terminal coupled to DC rail 105. Load 107 is coupled to primary midpoint connection 125 and the second terminal of switching device 123.

Switching devices 121 and 123 each include a switch such as an insulated gate bipolar transistor (IGBT), bipolar junction transistor (BJT), metal oxide semiconductor field effect transistor (MOSFET), gate turn-off thyristor (GTO), MOS-controlled thyristor (MCT), integrated gate-commutated thyristor (IGCT), silicon carbide (SiC) switch, gallium nitride (GaN) switch, or any other type of switch structured to selectively control the flow of electric current. Switching devices 121 and 123 each also include a diode coupled in an antiparallel configuration with the switch.

Auxiliary leg 110 includes auxiliary switching devices 111 and 113. Switching device 111 includes a first terminal coupled to DC rail 103 and a second terminal coupled to an auxiliary midpoint connection 115. Switching device 113 includes a first terminal coupled to auxiliary midpoint connection 115 and a second terminal coupled to DC rail 105.

Switching devices 111 and 113 each include a wide bandgap semiconductor switch, such as a gallium nitride switch or a silicon carbide switch. Switching devices 111 and 113 are structured to operate at a high switching rate. For example, devices 111 and 113 may operate at a switching rate greater than or equal to 10 kV/ms. Switching devices 111 and 113 also include a diode coupled in an antiparallel configuration with the switch.

In certain embodiments of converter 100, auxiliary leg 110 is arranged in a flying capacitor configuration. For example, auxiliary leg 110 may be arranged in a 3-level flying capacitor configuration in which a first switching device, a second switching device, a third switching device, and a fourth switching device are coupled in series between rail 103 and rail 105, wherein output terminal is coupled between the second switching device and the third switching device, and wherein a flying capacitor includes a first end coupled between the first switching device and the second switching device, and a second end coupled between the third switching device and the fourth switching device.

LC resonant circuit 130, also known as a resonant tank, is coupled between auxiliary midpoint connection 115 and primary midpoint connection 125. In the illustrated embodiment, LC resonant circuit 130 includes an air-core resonant inductor 117 and a resonant capacitor 119 coupled in series. In certain embodiments, LC resonant circuit 130 includes more than one air-core resonant inductor or more than one resonant capacitor. In certain embodiments, the passive components of LC resonant circuit 130 are arranged in parallel, or in a combination of series and parallel couplings.

Air-core resonant inductor 117, also known as a coreless inductor, does not include a core comprised of magnetic materials. Thus, an air-core resonant inductor does not experience core losses during operation of converter 100. The use of wide bandgap semiconductor devices in auxiliary leg 110 of converter allows the use of an air-core inductor in LC resonant circuit 130. This leads to lower losses, more compact design, and lower impact of the soft-switching behavior on the traditional converter control.

With the use of wide bandgap semiconductor devices for switching devices 111 and 113, the resonant time period may be shortened compared to resonant circuits using other switching devices. Converter 100 thus only requires a small inductance for inductor 117. For example, the inductance of resonant inductor may be less than 400 nH. Hence, an air-core inductor may be used for resonant inductor 117. In certain embodiments, air-core resonant inductor 117 is etched onto a printed circuit board. In certain embodiments, auxiliary leg and LC resonant circuit 130 are mounted on one circuit board and coupled to primary leg 120 as part of a retrofit kit effective to provide soft-switching functionality to a non-resonant converter.

Converter 100 includes a controller 140 operatively coupled to the switching devices of auxiliary leg 110 and primary leg 120. Controller 140 includes a gate driver circuit 141, a processing device 143, and a memory device 145, and sensing devices 147. Gate driver circuit 141 is structured to output activation signals to each of the switching devices of converter 100. Processing device 143 is structured to operate gate driver circuit 141 using instructions stored in memory on memory device 145 and sensor data received from sensing devices 147. Memory device 145 is a non-transitory computer readable medium. Sensing devices 147 include sensors or other types of devices structured to measure electrical characteristics of converter 100.

Controller 140 is structured to toggle each switching device by transmitting an activation signal structured to open or close the switching device. During a primary switch toggle, whereby switching device 121 or 123 are turned on or off, controller 140 operates switching devices 111 and 113 so as to transmit a current through LC resonant circuit 130. The current flowing through LC resonant circuit 130, as a result of the operation of switching devices 111 and 113, is effective to cause a substantially zero voltage condition or substantially zero current condition across the switching device of primary leg 120 being toggled. A substantially zero voltage condition may include a voltage across a switching device that is 30% of nominal voltage, and a substantially zero current condition may include a current flowing through a switching device that is 30% of nominal current. It shall be appreciated that any or all of the foregoing features of converter 100 may also be present in the other power converters disclosed herein.

With reference to FIGS. 2A-2I, there is illustrated a process for soft-switching operations of converter 100 in FIG. 1. The soft-switching operations include causing a substantially zero voltage condition across a switch of converter 100 before the switch is closed and causing a substantially zero current condition across a switch of converter 100 before the switch is opened.

Figure 2A:
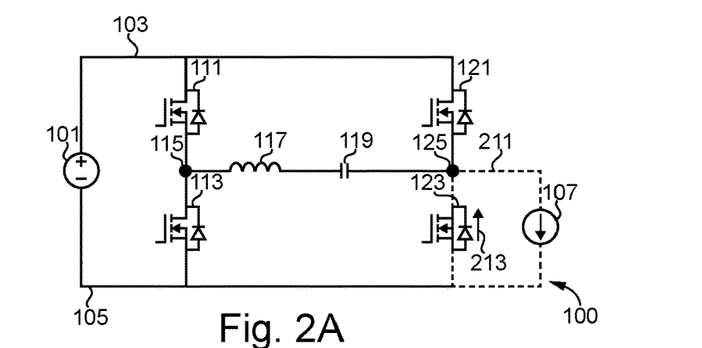
FIG. 2A-2I illustrate current flow through the exemplary power converter of FIG. 1 during soft-switching operation.

In the initial state of converter 100 as shown in FIG. 2A, the switch of primary switching device 123 is on, the switch of primary switching device 121 is off and the switches of auxiliary switching devices 111 and 113 are off. Current is flowing through the diode of switching device 123 and load 107 according to a current path 211 in a direction indicated by arrow 213.

Figure 2B:
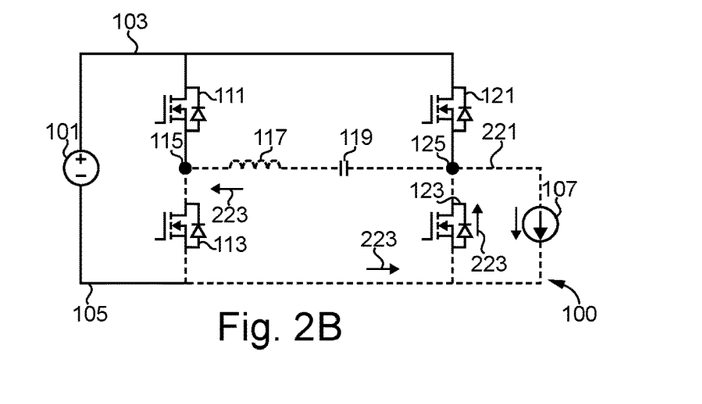

As shown in FIG. 2B, controller 140 has opened the switch of primary switching device 123 and closed auxiliary switching device 113. Current continues to flow through the diode of switching device 123 and load 107, and begins to flow through the switch of switching device 113 and LC resonant circuit 130 according to current path 221 in a direction indicated by a plurality of arrows 223.

Figure 2C:
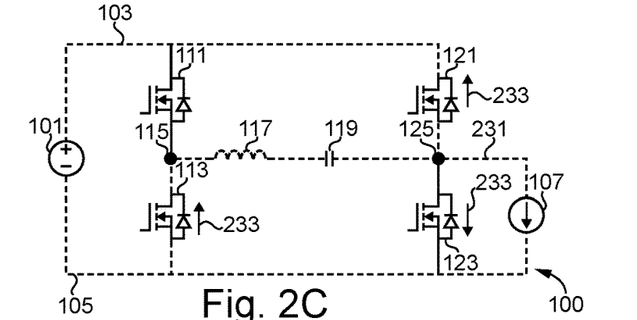

As shown in FIG. 2C, current flows in a current path 231 in a directions indicated by a plurality of arrows 233. Current begins to flow through LC resonant circuit 130 in the opposite direction due to resonance. Once the magnitude of the current flowing through LC resonant circuit 130 increases to the magnitude of the current flowing through load 107, the diode of switching device 123 turns off. Current no longer flows through the diode of switching device 123. The magnitude of current through LC resonant circuit 130 continues to rise until the current through LC resonant circuit 130 is greater than the current through load 107, at which time current begins to flow through the diode of switching device 121 and power supply 101. Controller 140 closes the switch of switching device 121 once current begins to flow through the diode of switching device 121. Controller 140 also opens the switch of auxiliary switching device 113.

Figure 2D:
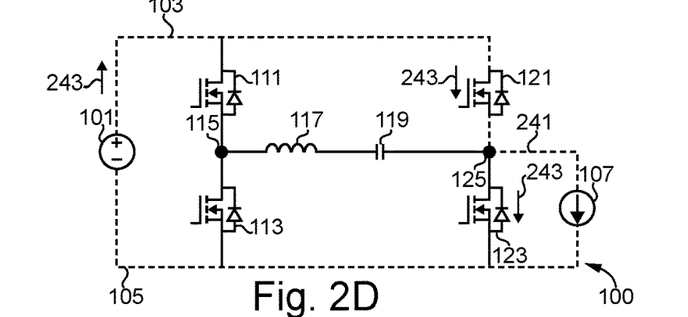

As shown in FIG. 2D, current flows in a current path 241 in a direction indicated by a plurality of arrows 243. Current through LC circuit 130 has decreased to zero, causing the diode of auxiliary switching device 113 to turn off. Current flows through power source 101, the switch of switching device 121, and load 107. During periods of operation where primary switching devices 121 and 123 are not being toggled, no current flows through auxiliary leg 110 or LC resonant circuit 130.

Figure 2E:
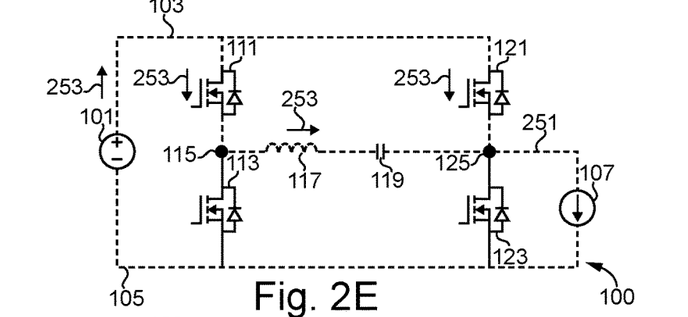

As shown in FIG. 2E, controller 140 begins the process of turning on the switch of primary switching device 123 by closing the switch of auxiliary switching device 111. Current flows in a current path 251 in a direction indicated by a plurality of arrows 253. Current flows through power source 101, the switch of auxiliary switching device 111, switch of primary switching device 121, LC resonant circuit 130, and load 107. Once auxiliary switching device 111 is turned on, current through LC resonant circuit 130 increases.

Figure 2F:
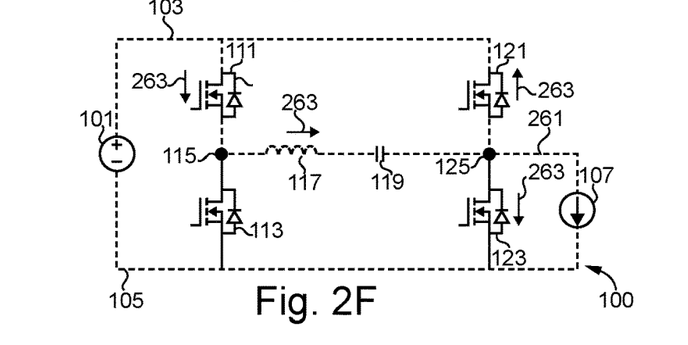

As shown in FIG. 2F, current flows in a current path 261 in a direction indicated by a plurality of arrows 263. Current flows through power source 101, switch of auxiliary switching device 111, the diode of primary switching device 121, LC resonant circuit 130, and load 107. As the magnitude of the current flowing through LC resonant circuit 130 increases to the magnitude of the current flowing through load 107, current through switching device 121 reverses direction. The diode of primary switching device 121 is turned on, followed by controller 140 turning off the switch of primary switching device 121.

Figure 2G:
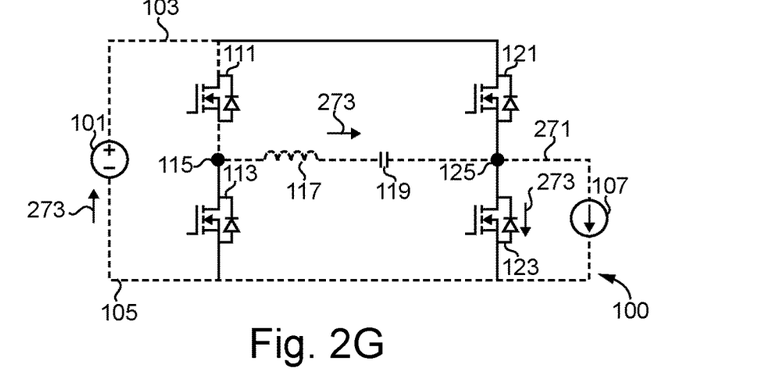

As shown in FIG. 2G, current flows in a current path 271 in a direction indicated by a plurality of arrows 273. Current flows through power source 101, the switch of auxiliary switching device 111, LC resonant circuit 130, and load 107. LC resonant circuit 130 continues to charge until there is a substantially zero voltage condition across primary switching device 123.

Figure 2H:
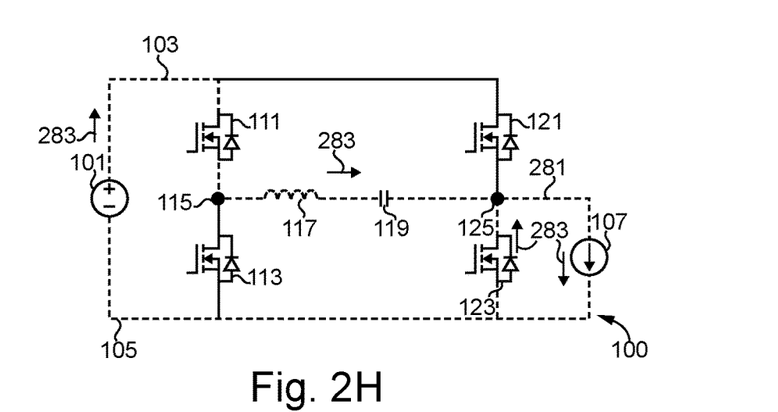

As shown in FIG. 2H, current flows in a current path 281 in a direction indicated by plurality of arrows 283. Current flows through power source 101, the switch of auxiliary switching device 111, LC resonant circuit 130, load 107, and the diode of primary switching device 123. The switch of primary switching device 123 is closed under substantially zero voltage condition.

Figure 2I:
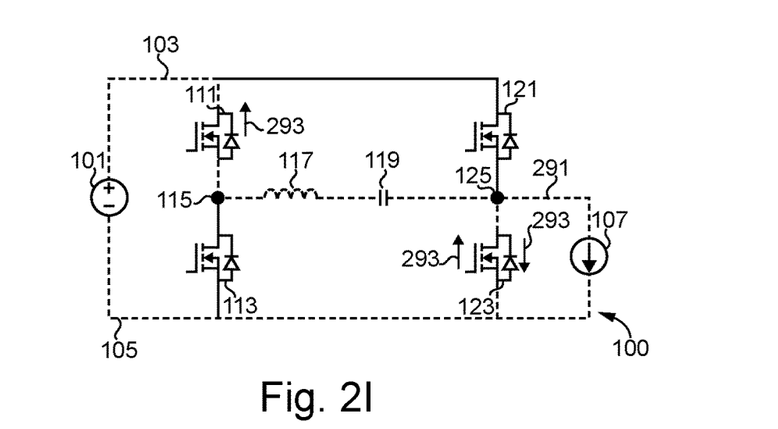

As shown in FIG. 2I, flows in a current path 291 in a direction indicated by a plurality of arrows 293. Current flows through power source 101, the diode of auxiliary switching device 111, LC resonant circuit 130, load 107, and the diode of primary switching device 123. Due to achieving residence, current through LC resonant circuit 130, switching device 111, and power source 101 reverses direction before falling to 0 A.

Figure 3:
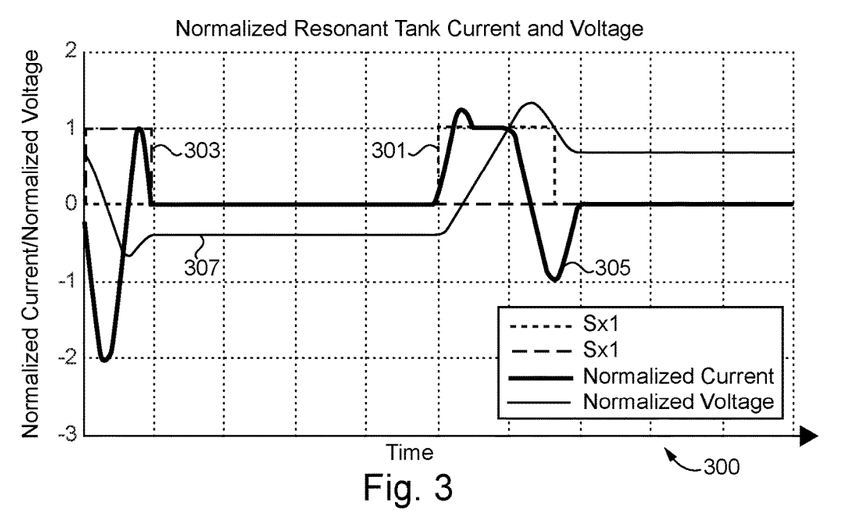
FIG. 3 is a graph illustrating soft-switching operation of an exemplary power converter.

With respect to FIG. 3, there is illustrated a graph 300 illustrating the normalized resonant tank current and voltage during soft-switching operation. Graph 300 includes line 301 representing an activation signal transmitted to switching device 111; line 303 representing and activation signal transmitted to switching device 113; line 305 representing normalized current through LC resonant circuit 130, and the line 307 representing normalized voltage across LC resonant circuit 130.

Figure 4:
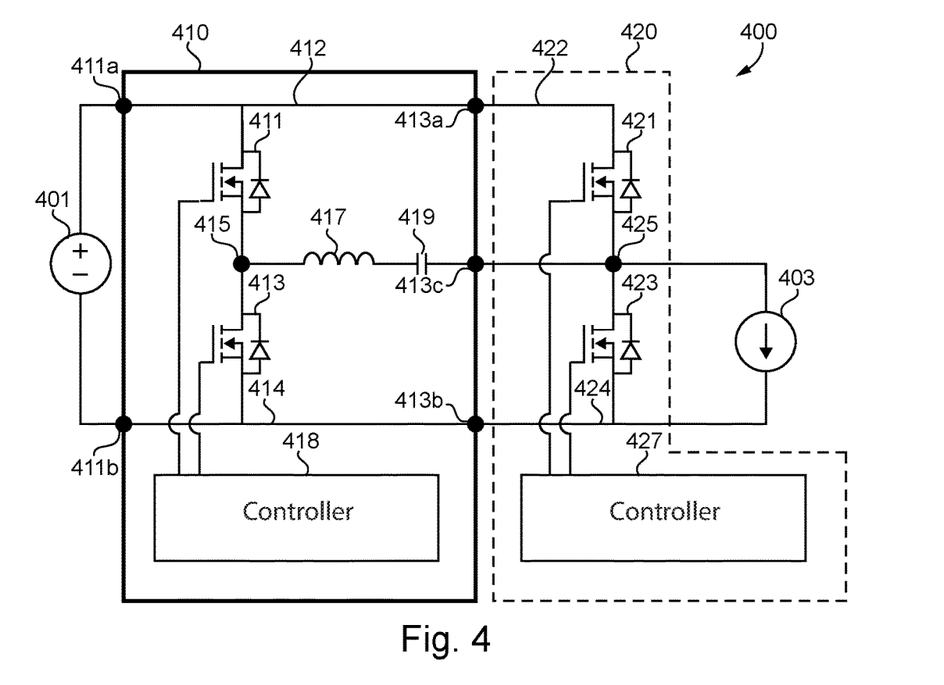
FIG. 4 illustrates an exemplary retrofit auxiliary circuit for a non-resonant power converter.

With reference to FIG. 4, there is illustrated an exemplary power converter system 400 including a retrofit auxiliary circuit 410 and a non-resonant power converter 420. While the embodiments described hereinafter may not specifically describe features analogous to the features of power converter 100, such features may nonetheless be employed in connection with system 400. Auxiliary circuit 410 is a retrofit kit structured to provide a current to power converter 420 effective to allow power converter 420 to operate in a soft-switching mode, whereby the switches of power converter 420 are turned on or off in a substantially zero voltage condition or substantially zero current condition.

Auxiliary circuit 410 includes input terminals 411a and 411b each coupled to a DC power source 401. Auxiliary circuit 410 includes a first DC bus rail 412 coupled to input terminal 411a, and a second DC bus rail 414 coupled to input terminal 411b. Switching devices 411 and 413 are coupled in series at a midpoint connection 415 between rails 412 and 414. An LC resonant circuit including air-core resonant inductor 417 and resonant capacitor 419 is coupled together in series and to midpoint connection 415. Auxiliary circuit 410 includes output terminal 413a coupled to rail 412, output terminal 413b coupled to rail 414, and output terminal 413c coupled to the LC resonant circuit, specifically resonant capacitor 419.

Switching devices 411 and 413 are controlled by controller 418 so as to produce a current through air-core resonant inductor 417 and resonant capacitor 419, in the manner described above with respect to FIG. 2A-2I. In certain embodiments, controller 418 includes smart analog or digital circuitry, such as an integrated circuit.

Power converter 420 is coupled to auxiliary circuit 410 by way of auxiliary circuit output terminals 413a, 413b, and 413c. Power converter 420 includes a first DC bus rail 422 coupled to output terminal 413a, a second DC bus rail 424 coupled to output terminal 413b, and a midpoint connection 425 coupled to output terminal 413c. A primary switching device 421 is coupled between rail 422 and midpoint connection 425, and a primary device 423 is coupled between midpoint connection 425 and DC bus rail 424. Load 403 is coupled between midpoint connection 425 and DC bus rail 424. Primary switching devices 421 and 423 are controlled by a controller 427 so as to receive current from auxiliary circuit 410, and operate in a soft-switching mode. In certain embodiments, controller 427 is structured to communicate with controller 418. In other embodiments, power converter 420 is replaced by a power converter with a different topology, such as a flying capacitor topology as described above.

Figure 5:
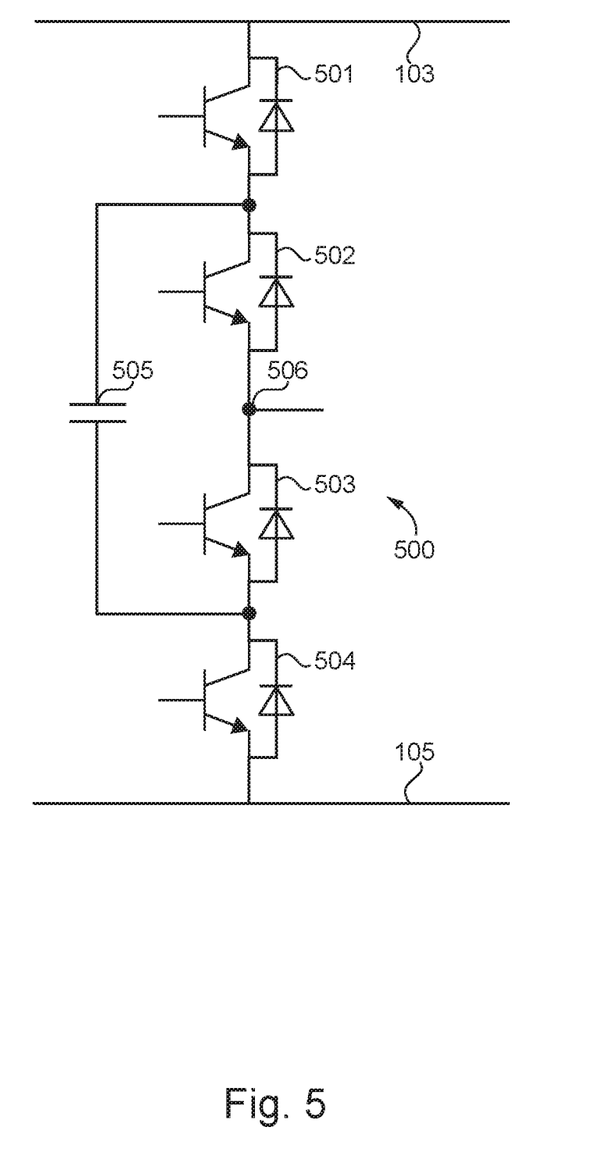
FIG. 5 illustrates an exemplary auxiliary leg of an exemplary power converter.

With reference to FIG. 5, there is illustrated an exemplary auxiliary leg 500 of an exemplary power converter, such as resonant power converter 100 in FIG. 1. As described above, auxiliary leg 110 of converter 100 may be replaced by a leg with a flying capacitor configuration, such as leg 500. Auxiliary leg 500 includes a plurality of switching devices arranged in a 3-level flying capacitor configuration. Leg 500 includes a first switching device 501, a second switching device 502, a third switching device 503, and a fourth switching device 504 coupled in series between rail 103 and rail 105 of power converter 100. An output terminal 506 is coupled between switching devices 502 and 503. Leg 500 includes a flying capacitor 505 including a first end coupled between the switching devices 501 and 502, and a second end coupled between switching devices 503 and 504.

Further written description of a number of exemplary embodiments shall now be provided. One embodiment is a resonant power converter comprising a DC bus including a first rail and a second rail; a primary leg coupled between the first rail and the second rail, the primary leg including a first primary switch and a second primary switch coupled at a primary midpoint connection; an auxiliary leg coupled between the first rail and the second rail, the auxiliary leg including a first auxiliary switch and a second auxiliary switch coupled at an auxiliary midpoint connection; an LC resonant circuit including an air-core resonant inductor and a resonant capacitor coupled between the auxiliary midpoint connection and the primary midpoint connection; and a controller structured to control the first auxiliary switch, the second auxiliary switch, the first primary switch, and the second primary switch so as to provide resonant operation of the LC resonant circuit effective to provide a substantially zero voltage condition across the first primary switch when closing the first primary switch and to provide the substantially zero voltage condition across the second primary switch when closing the second primary switch.

In certain forms of the foregoing resonant power converter, the first auxiliary switch and the second auxiliary switch are wide bandgap semiconductor switches. In certain forms, the first auxiliary switch and the second auxiliary switch are gallium nitride semiconductor switches. In certain forms, the controller is structured to the first auxiliary switch, the second auxiliary switch, the first primary switch, and the second primary switch so as to provide resonant operation of the air-core resonant inductor and resonant capacitor effective to provide a substantially zero current condition across the first auxiliary switch when opening the first auxiliary switch and to provide the substantially zero current condition across the second auxiliary switch when opening the second auxiliary switch. In certain forms, the primary leg is structured to receive DC power from the first rail and second rail, convert the DC power to AC power, and output the AC power at the primary midpoint connection. In certain forms, the auxiliary leg and the LC resonant circuit are mounted on a printed circuit board, wherein the air-core resonant inductor is lithographed on the printed circuit board, and wherein the LC resonant circuit includes an output terminal structured to couple the LC resonant circuit to the primary midpoint connection. In certain forms, the substantially zero voltage condition is a voltage with a magnitude less than 30% of nominal DC voltage. In certain forms, the auxiliary leg is arranged in a flying capacitor configuration.

Another exemplary embodiment is a resonant circuit structured to be coupled to a non-resonant power converter including a switching device, the resonant circuit comprising: a first input terminal structured receive power from a DC power source; a second input terminal structured receive power from the DC power source; a first DC bus rail operatively coupled to the first input terminal; a second DC bus rail operatively coupled to the second input terminal; a leg including a first wide bandgap semiconductor device and a second wide bandgap semiconductor device coupled in series at a midpoint connection; an LC resonant tank including an air-core resonant inductor and a resonant capacitor, the LC resonant tank being coupled between the midpoint connection and an output port; and a controller structured to operate the first wide bandgap semiconductor device and the second wide bandgap semiconductor device so as to provide a resonant current to the non-resonant power converter by way of the LC resonant tank effective to provide a substantially zero voltage condition across the switching device when turning the switching device on.

In certain forms of the resonant circuit the first wide bandgap semiconductor device and the second wide bandgap semiconductor device include a gallium nitride semiconductor switch. In certain forms, the resonant circuit comprising a second output port coupled to the first DC bus rail and a third output port operatively coupled to the second DC bus rail, wherein the second output port and the third output port are structured to be coupled to the non-resonant power converter. In certain forms, the resonant circuit includes a printed circuit board operatively coupled to the first input terminal, the second input terminal, the output port, the leg, and the LC resonant tank. In certain forms, inductance of the LC resonant tank is less than 400 nH. In certain forms, the controller is structured to operate the first wide bandgap semiconductor device and the second wide bandgap semiconductor device so as to provide the resonant current to the non-resonant power converter by way of the LC resonant tank effective to provide a substantially zero current condition through the switching device when turning the switching device off. In certain forms, the leg includes a third wide bandgap semiconductor device a fourth wide bandgap semiconductor device, and a flying capacitor, and wherein the leg is arranged in a flying capacitor configuration.

A further exemplary embodiment is a method for operating a bi-level power converter comprising operating circuitry including an auxiliary circuit including a first auxiliary switching device and a second auxiliary switching device coupled at an auxiliary midpoint connection, a primary circuit including a first primary switching device and a second primary switching device coupled at a primary midpoint connection, and an LC resonant tank including an air-core resonant inductor and a resonant capacitor coupled between the auxiliary midpoint connection and the primary midpoint connection; generating a resonating current using the air-core resonant inductor and the resonant capacitor of the LC resonant tank by operating the auxiliary circuit such that a voltage across the first primary switching device is a substantially zero voltage condition; opening the first primary switching device; and closing the second primary switching device in a substantially zero voltage condition.

In certain forms of the foregoing method, the method comprises coupling an output terminal of the auxiliary circuit to the primary midpoint connection. In certain forms, the first auxiliary switching device and second auxiliary switching device include a wide bandgap semiconductor device structured to operate at a switching rate greater than 10 kV/ms. In certain forms, the method comprises generating a resonating current using the air-core resonant inductor and the resonant capacitor of the LC resonant tank by operating the auxiliary circuit such that a voltage across the second primary switching device is a substantially zero voltage condition; opening the second primary switching device; and closing the first primary switching device in a substantially zero voltage condition. In certain forms, the auxiliary circuit includes a third auxiliary switching device, a fourth auxiliary switching device, and a flying capacitor, wherein the auxiliary circuit is arranged in a flying capacitor configuration.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A resonant power converter comprising:
   a DC bus including a first rail and a second rail;

a primary leg coupled between the first rail and the second rail, the primary leg including a first primary switch and a second primary switch coupled at a primary midpoint connection;

an auxiliary leg coupled between the first rail and the second rail, the auxiliary leg including a first auxiliary switch and a second auxiliary switch coupled at an auxiliary midpoint connection, the first auxiliary switch including a wide bandgap semiconductor switch and the second auxiliary switch including a wide bandgap semiconductor switch;

an LC resonant circuit including an air-core resonant inductor and a resonant capacitor coupled between the auxiliary midpoint connection and the primary midpoint connection, the inductance of the LC resonant circuit being less than 400 nH; and a controller structured to control the first auxiliary switch, the second auxiliary switch, the first primary switch, and the second primary switch so as to provide resonant operation of the LC resonant circuit effective to provide a substantially zero voltage condition across the first primary switch when closing the first primary switch and to provide a substantially zero voltage condition across the second primary switch when closing the second primary switch.

2. The resonant power converter of claim 1 wherein the first auxiliary switch and the second auxiliary switch are gallium nitride semiconductor switches.

3. The resonant power converter of claim 1 wherein the controller is structured to the first auxiliary switch, the second auxiliary switch, the first primary switch, and the second primary switch so as to provide resonant operation of the air-core resonant inductor and resonant capacitor effective to provide a substantially zero current condition across the first auxiliary switch when opening the first auxiliary switch and to provide the substantially zero current condition across the second auxiliary switch when opening the second auxiliary switch.

4. The resonant power converter of claim 1 wherein the primary leg is structured to receive DC power from the first rail and second rail, convert the DC power to AC power, and output the AC power at the primary midpoint connection.

5. The resonant power converter of claim 1 wherein the auxiliary leg and the LC resonant circuit are mounted on a printed circuit board, wherein the air-core resonant inductor is lithographed on the printed circuit board, and wherein the LC resonant circuit includes an output terminal structured to couple the LC resonant circuit to the primary midpoint connection.

6. The resonant power converter of claim 1 wherein the substantially zero voltage condition is a voltage with a magnitude less than 30% of nominal DC voltage.

7. The resonant power converter of claim 1 wherein the auxiliary leg is arranged in a flying capacitor configuration.

8. A resonant circuit structured to be coupled to a non-resonant power converter including a switching device, the resonant circuit comprising:

a first input terminal structured receive power from a DC power source;

a second input terminal structured receive power from the DC power source;

a first DC bus rail coupled to the first input terminal;

a second DC bus rail operatively coupled to the second input terminal;

a leg including a first wide bandgap semiconductor device and a second wide bandgap semiconductor device coupled in series at a midpoint connection;

an LC resonant tank including an air-core resonant inductor and a resonant capacitor, the LC resonant tank being coupled between the midpoint connection and an output port, the LC resonant tank having an inductance less than 400 nH; and a controller structured to operate the first wide bandgap semiconductor device and the second wide bandgap semiconductor device so as to provide a resonant current to the non-resonant power converter by way of the LC resonant tank effective to provide a substantially zero voltage condition across the switching device when turning the switching device on.

9. The resonant circuit of claim 8 wherein the first wide bandgap semiconductor device and the second wide bandgap semiconductor device include a gallium nitride semiconductor switch.

10. The resonant circuit of claim 8 comprising a second output port coupled to the first DC bus rail and a third output port coupled to the second DC bus rail, wherein the second output port and the third output port are structured to be coupled to the non-resonant power converter.

11. The resonant circuit of claim 8 wherein the resonant circuit includes a printed circuit board coupled to the first input terminal, the second input terminal, the output port, the leg, and the LC resonant tank.

12. The resonant circuit of claim 8 wherein the controller is structured to operate the first wide bandgap semiconductor device and the second wide bandgap semiconductor device so as to provide the resonant current to the non-resonant power converter by way of the LC resonant tank effective to provide a substantially zero current condition through the switching device when turning the switching device off.

13. The resonant circuit of claim 8, wherein the leg includes a third wide bandgap semiconductor device, a fourth wide bandgap semiconductor device, and a flying capacitor, and wherein the leg is arranged in a flying capacitor configuration.

14. A method for operating a bi-level power converter comprising:

operating circuitry including:
an auxiliary circuit including a first wide bandgap switching device and a second wide bandgap switching device coupled at an auxiliary midpoint connection,
a primary circuit including a first primary switching device and a second primary switching device coupled at a primary midpoint connection, and
an LC resonant tank including an air-core resonant inductor and a resonant capacitor coupled between the auxiliary midpoint connection and the primary midpoint connection, the inductance of the LC resonant tank being less than 400 nH;

generating a resonating current using the air-core resonant inductor and the resonant capacitor of the LC resonant tank by operating the auxiliary circuit such that a voltage across the first primary switching device is a substantially zero voltage condition;

opening the first primary switching device; and closing the second primary switching device in the substantially zero voltage condition.

15. The method of claim 14 comprising coupling an output terminal of the auxiliary circuit to the primary midpoint connection.

16. The method of claim 14 wherein the first wide bandgap switching device and second wide bandgap switching device include a wide bandgap semiconductor device structured to operate at a switching rate greater than 10 kV/ms.

17. The method of claim 14 comprising:
generating a resonating current using the air-core resonant inductor and the resonant capacitor of the LC resonant tank by operating the auxiliary circuit such that a voltage across the second primary switching device is the substantially zero voltage condition;
opening the second primary switching device; and
closing the first primary switching device in the substantially zero voltage condition.

18. The method of claim 14 wherein the auxiliary circuit includes a third wide bandgap switching device, a fourth wide bandgap switching device, and a flying capacitor, wherein the auxiliary circuit is arranged in a flying capacitor configuration.

* * * * *